(No Model.)

R. W. HAWKESWORTH.
CONTACT TROLLEY.

No. 521,163.  Patented June 12, 1894.

Witnesses
Jno. G. Hinkel
Allen N. Dobson

Inventor
Robert W. Hawkesworth
By Foster Freeman
Attorneys

UNITED STATES PATENT OFFICE.

ROBERT W. HAWKESWORTH, OF EAST ORANGE, NEW JERSEY.

CONTACT-TROLLEY.

SPECIFICATION forming part of Letters Patent No. 521,163, dated June 12, 1894.

Application filed March 15, 1894. Serial No. 503,752. (No model.)

*To all whom it may concern:*

Be it known that I, ROBERT W. HAWKESWORTH, a citizen of the United States, residing in the town of East Orange, Essex county, and State of New Jersey, have invented certain new and useful Improvements in Contact-Trolleys, of which the following is a specification.

My invention relates to trolley bars for railway cars and consists in constructing the bar with two arms connected together preferably by a spring connection as fully set forth hereinafter and as illustrated in the accompanying drawings, in which—

Figure 1:
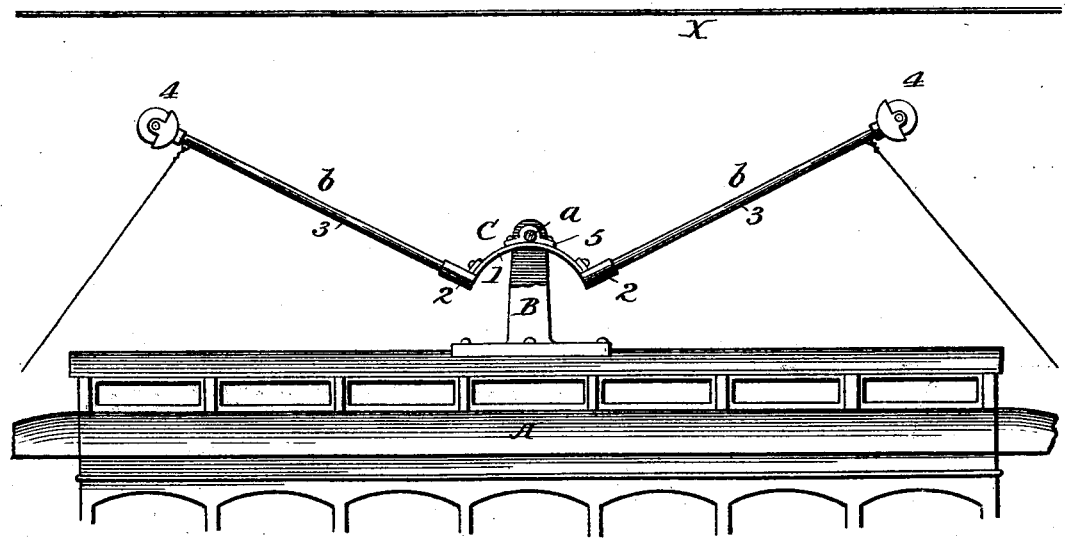
Figure 2:
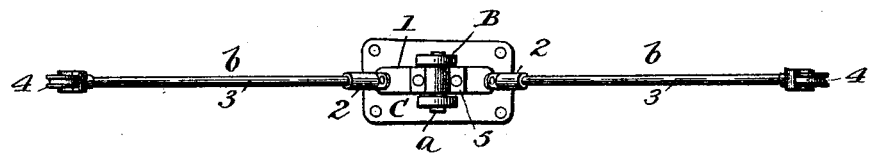
Figure 3:
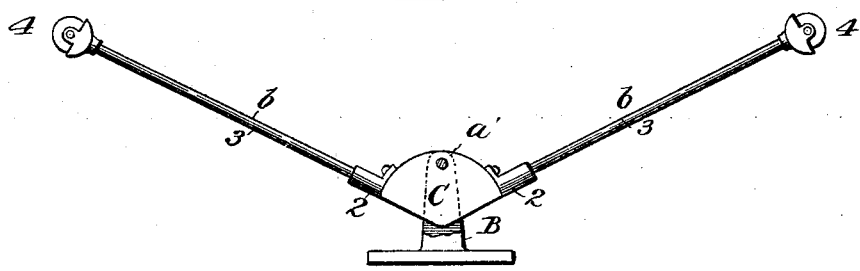

Figure 1 shows the top of a railway car provided with my improved trolley bar and illustrating one form in which the same may be made. Fig. 2 is a plan view of the construction shown in Fig. 1. Fig. 3 is a modification.

The car A is constructed in any of the usual forms and at the top of the same is a standard B, which may be a fixed standard, split or otherwise constructed so as to support a transverse bolt or trunnion $a$, which serves as a pivot for the trolley bar B.

The trolley bar B instead of consisting of a single bar is composed of two arms $b$, $b$, having a spring connection C. The spring connection C, may be of different forms. As shown it consists of a curved spring plate 1, which is formed by simply bending to a curved form a flat blade or plate of steel and to the ends of this curved plate are riveted socket pieces 2, 2, each of which receives a staff 3, preferably of wood, which has at the outer end, the trolley wheel 4, which may be journaled to turn on the staff in any suitable manner. At the center of the spring plate 1 is a bracket 5 which has a recess for the passage of the bolt $a$, or the trunnions may extend from said bracket. Either end of the bar may be pulled down so as to elevate the other to bring the trolley wheel in contact with the overhead wire X, and it will be seen that owing to the elastic connection between the two arms of the bar, when one arm is pulled down and the operating cord is secured, the other will be held up against the wire with a spring contact and will yield to any inequalities without losing its contact with the wire, or without danger of breaking the bar in case any fixed object should be struck.

If the draft cord should become detached in any way, owing to the pivoting of the bar at a point midway between the two arms and above the lower sides of the said arms, the bar would swing to the substantially horizontal position, shown in the drawings without danger of either trolley wheel being brought in contact with the wire, or of either arm coming in contact with the top of the car. This result would be secured, of course, even if the connection between the two arms was not a spring connection, as in Fig. 3, which shows the arms at an angle to each other pivoted at $a'$, so as to swing to a mid-position carrying each out of contact with the wire when new power is applied to depress one more than the other.

It will, of course, be evident that the two arms may be connected by spring connections of different construction.

I have shown that which is illustrated in the drawings merely as an example of one way in which my invention may be carried out.

Without limiting myself to the precise construction and arrangement of parts shown, I claim as my invention—

1. The combination in a trolley bar of two arms one at an angle to the other and a support to which said bar is pivoted at a point between and above the ends of the arms, substantially as described.

2. The combination with the standard of a railway car, of a trolley bar consisting of two arms connected by an intermediate spring plate or bar, substantially as described.

3. The combination with a railway car of a standard, and a trolley bar pivoted to said standard, and provided with trolley wheels and consisting of two arms in the same vertical plane having an intermediate spring connection, whereby one can move to a limited extent independently of the other substantially as set forth.

4. The combination in a trolley bar, of a spring plate, a support to which the plate is pivoted, arms extending from said plate and wheels carried by the arms, substantially as described.

5. The combination of the curved and pivoted spring plate, sockets 2, 2, staffs 3, 3, and wheels 4, 4, substantially as described.

In testimony whereof I have signed my name to this specification in the presence of two subscribing witnesses.

ROBERT W. HAWKESWORTH.

Witnesses:
GEORGE JACOBS,
ERNEST F. AYRAULT.